United States Patent [19]

Miller

[11] 4,045,002

[45] Aug. 30, 1977

[54] MULTI-PURPOSE LOAD WINCH

[76] Inventor: Errol S. Miller, 14500 S. McNab, No. 413, Bellflower, Calif. 90706

[21] Appl. No.: 568,137

[22] Filed: Apr. 14, 1975

[51] Int. Cl.² .............................................. A63B 61/04
[52] U.S. Cl. .................................. 254/164; 105/477; 24/68 CD
[58] Field of Search ........ 254/164, 161, 167, 186 AC; 105/469, 470, 477; 24/68 CD, 269, 81 CC, 196, 71.2, 194, 171, 126 R; 242/74

[56] References Cited

U.S. PATENT DOCUMENTS

| | | | |
|---|---|---|---|
| 591,238 | 10/1897 | Mosure | 24/71.2 |
| 1,514,639 | 11/1924 | Triece et al. | 254/164 |
| 2,509,966 | 5/1950 | Cox | 105/477 |
| 3,099,055 | 7/1963 | Huber | 105/469 |
| 3,175,806 | 3/1965 | Preti, Jr. | 24/68 CD |
| 3,697,045 | 10/1972 | Farley | 105/477 |
| 3,825,227 | 7/1974 | Whitehill et al. | 254/164 |

FOREIGN PATENT DOCUMENTS

| | | | |
|---|---|---|---|
| 1,524,564 | 3/1967 | France | 24/269 |

*Primary Examiner*—Robert J. Spar
*Assistant Examiner*—Kenneth Noland
*Attorney, Agent, or Firm*—John J. McCormack

[57] ABSTRACT

An improved vehicle-mounted winch is disclosed characterized by a sliding bar allowing use of a web or strand to be secured thereto and tightened thereby, e.g., to secure a load.

10 Claims, 6 Drawing Figures

MULTI-PURPOSE LOAD WINCH

BACKGROUND OF THE INVENTION

1. Field of Invention

The present invention relates to adjustable load binder securing devices and more particularly to load winches.

2. Description of Prior Art

Load winches are known in the art, especially as employed on vehicles for adjustably securing thereto binders about a load, e.g., as a bed-mounted load-tightening winch on a truck. One conventional form of load winch has a rotatable mandrel (e.g., a barrel, tube or drum) which is "pinned" with one or several pins adapted for engaging a rope or cable securing the load. Another type is "slotted" with a slot cut through the winch drum to receive a web; or alternatively, with an "open" multi-rod drum adapted to engage a web or strand intertwined in the rods. There are also combined "pin/slot" types.

But a "pinned type" load winch can only handle strands (not webs); while a "slotted" type is inherently weal structurally (especially for the wider 4 inch + binder bands which can readily overstress and buckle such a mandrel). The combined pin/slot type is not only weakened by the slotting, but is unduly long and bulky, typically.

SUMMARY OF THE INVENTION

A load winch is provided according to the invention, which differs from previous load winches in that it utilizes a "sliding bar yoke" (or U-bolt) or like retainer means, which permits the use of load binders in the form of a "web" tensioner (such as a flexible band of variable widths), or a "strand" tensioner (such as a rope, wire or cable). One resulting advantage is a lighter winch; also the winch is stronger, not being weakened by slots cut in the mandrel body. Also, this design allows the binder segment, once tautened, to secure itself (e.g., by threading through a U-bolt) on the mandrel.

Further, it will be apparent that the materials and parts needed to fabricate such a winch are very well known and are readily available, as well as being simple and inexpensive. Also, the device is simple, trouble-free, and easy to operate. For instance, in a preferred embodiment a simple steel bracket, two lengths of pipe, a U-bolt, a ratchet/pawl combination and a fastener or two constitute the entire array of parts.

A salient purpose of my invention is to provide a winch which, when attached to a loaded platform like a truckbed, will allow the use of many, various types of binders for securing the load —binders such as rope, wire cable, and flexible web bands of varying widths.

DESCRIPTION OF PREFERRED EMBODIMENT

Figure 1:
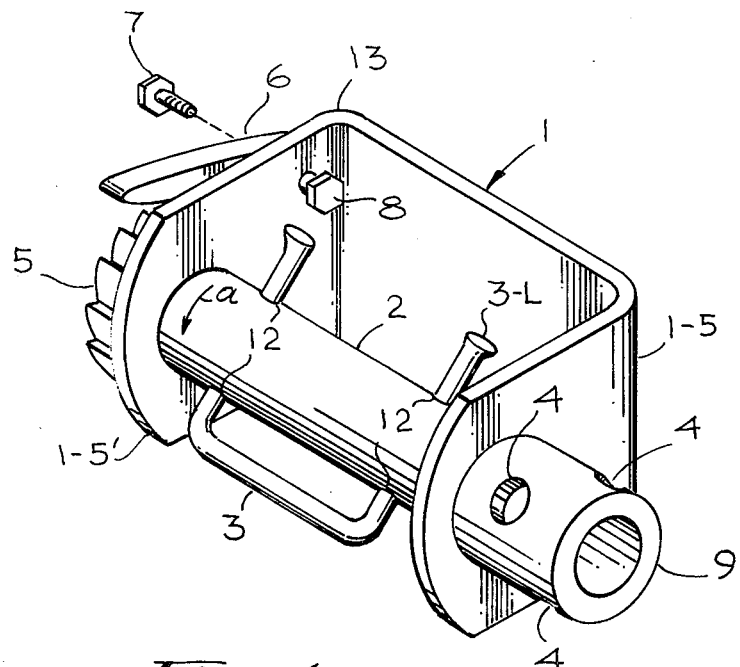
FIG. 1 is a perspective view of a preferred embodiment of the winch.

Referring to FIG. 1, a preferred embodiment of a winch according to this invention comprises a mandrel 2 mounted for rotation on a support frame 1 to be ratchet-driven and adapted to receive a binder-engaging yoke or U-bolt 3 adapted to wrap the binder segment onto the mandrel.

Frame 1 is formed in a U-shape, having its end sections orthogonal to its medial section. Each end section has a bearing aperture of such diameter and (registered) alignment as to accomodate mandrel 2, passing therethrough, to rotate freely, being supported by the two end sections. Frame 1 thus serves as a support and bearing surface for the mandrel 2, as well as providing a mounting surface for the ratchet and pawl, plus a means for coupling the winch to a support, such as a truckbed. The medial section of the frame 1 may be conventionally secured to the side rail of a truck trailer — e.g., via weldments or bolts, as well known in the art.

The mandrel 2 preferably comprises a hollow tube adapted to freely rotate in the registered bearing holes in ends 1-5, 1-5' of frame 1. One end of mandrel 2 has a tubular cap 9 of slightly larger diameter affixed (welded) thereto and adapted to rotatably secure the mandrel on the frame, being too large in diameter to pass through the associated bearing hole. Cap 9 is also adapted to afford a means of engaging mandrel-rotating means; i.e., a number (here two) of holes 4 provided therethrough for the selective insertion of a crank (rotating handle) for rotating the mandrel.

Mandrel 2 is of such length that when cap 9 is affixed thereon, a ratchet gear 5 may be affixed (welded) on its opposite end while leaving sufficient clearance (with the frame) for free rotation. Ratchet 5 will function, as understood in the art, to selectively restrict free rotation of mandrel 2 in one direction only (arrow a), preventing rotation in the opposite direction via engagement with pawl 6. Pawl 6 is pivotally mounted onto a frame end 1-5', such as via a pivot-bolt 7 which is screwed into a threaded hole 13 in frame 1 and locked there with a nut 8, hole 13 being located so that pawl 6 may be engaged and disengaged with ratched 5 for the well-known ratchet-action. Disengagement of pawl 6 will, thus, allow free rotation of the ratchet 5 and mandrel 2 in either direction.

Along the midsection of mandrel 2 (i.e., between the sides 1-5, 1-5' of frame 1), a pair of holes 12 are provided through the mandrel for the insertion of U-rod 3. These holes are located on a diameter of the mandrel 2 and are of such size and alignment as to accommodate the legs of yoke 3, which should slide-through freely.

U-rod 3 may preferably be formed from round rod stock of proper diameter to freely slide through holes 12. Legs 3-L of yoke 3 are formed orthogonal to its medial section, and spaced so their center lines will register with the axes of receiving bores 12. Legs 3-L will be sufficiently long that, with U-rod 3 inserted completely into mandrel 2, the mandrel will nonetheless be able to rotate freely within frame 1. After initial insertion of U-rod 3 through mandrel 2, the ends of legs 3-L are preferably deformed (e.g., band off-center) so as to retain yoke 3 on the mandrel.

The foregoing construction may evidently be effected using very simple, commonly available, inexpensive parts such as are further described in Table 1 below:

TABLE I (Winch Parts)

Ratchet 5 and Pawl 6 — May be flame-cut from mild steel; with pawl mounted on ½ inch heat-treated bolt 7.

Mandrel 2 — May be cut from heavy X or extra-heavy XX pipe, for maximum strength; bar holes may be steel-reinforced.

Webbing Slots — May be flame-cut and smoothed to prevent abrasion.

Mandrel Cap 9 — May be welded solidly to mandrel for strength and good appearance.

Figure 6:
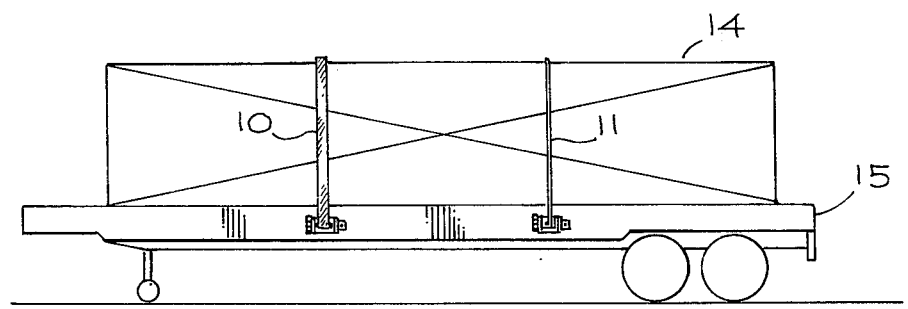
FIG. 6 is a side elevational view of an exemplary loaded truck trailer showing typical application of a pair of such winches with associated binder segments.

Binders — Both "right" and "left-hand" styles (bar holes on right or left end respectively may be used). Binders may be used with webbing also, as at 10 FIGS. 4 and 6. Mandrel 2 is preferably slotted to accept 4 inch webbing. All webbing binders should dictate extra-heavy, XX, mandrels.

Although typical configurations and dimensions are described for implementing this invention, workers will plainly see how versatile such a design is, being readily adaptable to a multitude of different configurations and uses with very little trouble.

OPERATION:

Flexible Web Binders

Figure 2:
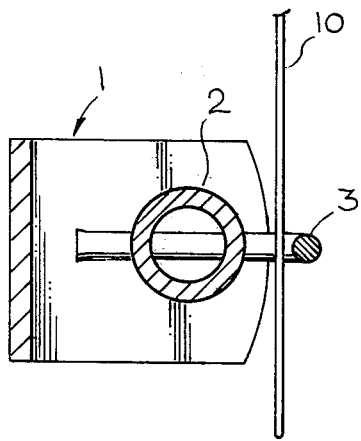
FIGS. 2 and 3 are sectional views of the winch, also showing the engagement of a flexible-band binder; with FIG. 3 indicating binder condition after the mandrel has been turned through one revolution.
Figure 3:
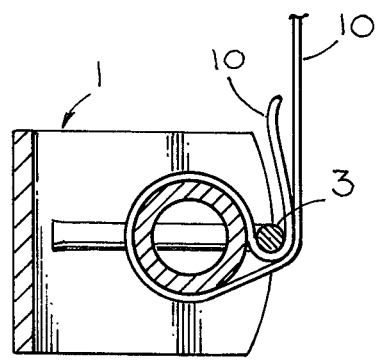

Referring to FIGS. 2 and 3, a flexible web (band) binder 10 of variable width (e.g., the common 2, 3 or 4 webbing) is first secured (generally by means of a hook and eye) on the opposite side of the load platform (truck trailerbed) 15 from the winch. It is then passed securingly about the load 14 and then engaged with the load winch by threading it between the mandrel 2 and the U-rod 3 (which has been pulled-out for sufficient clearance). The U-rod 3 is then thrust "fully-in" against mandrel 2 to clamp binder 10 snugly between it and the mandrel 2. Mandrel 2 is then rotated, taking the binder 10 with it (e.g., one revolution — FIG. 3), until sufficient tension has been produced in the binder 10 to secure the load satisfactorily.

The action of the second, and succeeding, layers of the binder 10 which cover U-rod 3 pull it against mandrel 2 and serve to clamp the binder and (therebetween U-rod 3 and the mandrel 2), preventing binder-slippage and subsequent loss of tension.

It is, therefore, a feature of this arrangement that the free-end of a binder will be held against removal or slippage once tube 2 is rotated only a few degrees beyond START condition (as shown in FIG. 2); and also a feature that both ends of the binder (band) will be held ever-tighter as mandrel 2 is further rotated (a crank being inserted into one of the bores 4 in cap 9 for this).

Strand (Rope) Binder

Figure 5:
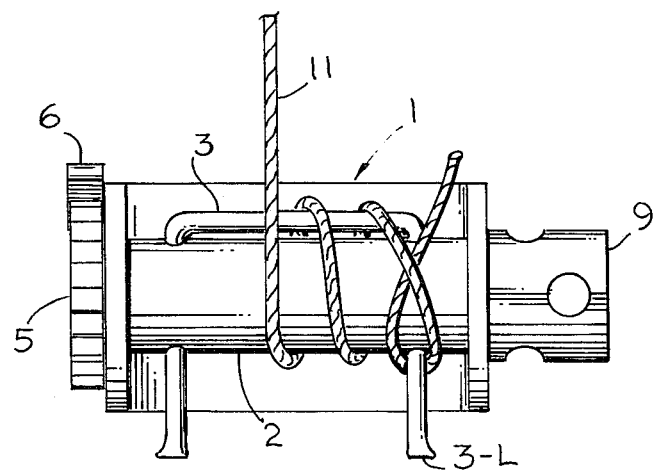
FIG. 5 is a like view showing the condition of a strand (e.g., rope/wire) binder after several revolutions of the mandrel of FIGS. 1-3.

Referring now to FIG. 5, a rope or wire rope "strand" binder 11 is applied to the truck trailer and load in the same manner as the web binder described above. However, engagement with the winch requires that the yoke 3 be moved to its extreme Fully-IN position (with its medial section engaged against mandrel 2 and legs extending fully through the mandrel 2 to project beyond the other side a maximum). The strand binder 11 is then wrapped around one leg 3-L of yoke 3 so as to cross-over on itself. Mandrel 2 is then rotated, carrying binder 11 along to be wrapped thereon, until sufficient tension is produced. This overlapping securement of binder 11 about a projecting yokeleg, plus mandrel wrapping prevents slippage — yet is very easy to disengage (as with the web arrangement in FIGS. 2, 3).

Figure 4:
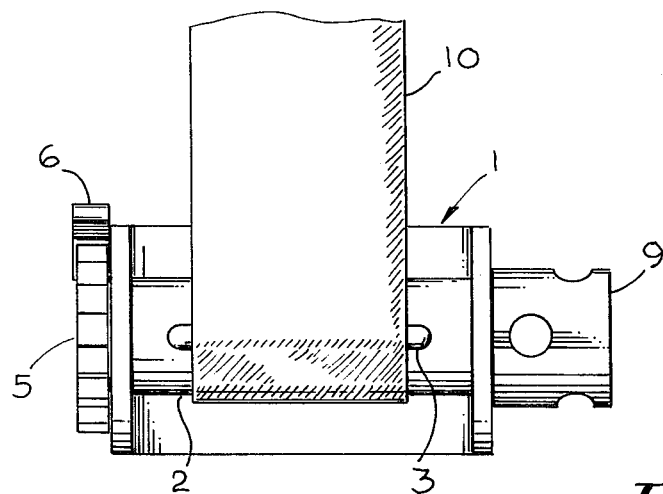
FIG. 4 is a front elevational view of a second winch embodiment showing a flexible-band engaged as in FIG. 3.

FIG. 4 illustrates an alternate, less-generally preferred arrangement, similar in construction and operation to the above except as follows, having a mandrel 2' which is slotted (at 31 instead of being provided with bores and a yoke) for engagement with the end of a web-binder 10'.

Workers in the art will appreciate the novelty and surprising advantages of load winches constructed according to this invention and will visualize other alternate, equivalent embodiments employing a tubular mandrel rotatably supported on a support frame, and including crank-rotation means along with ratchet/pawl anti-slippage means; together with binder-end engagement means, preferably in the form of a yoke bar inserted through the mandrel and adapted to engage both web and strand binders.

While the invention has been described in its preferred embodiments it is to be understood that the words which have been used are words of description rather than limitation and that changes may be made within the purview of the appended claims without departing from the true scope and spirit of the invention.

What is claimed is:

1. An improved load tensioning winch apparatus adapted for tensioning engagement with a wide variety of load binders and comprising:

mandrel means comprising a cylindrical tube mounted rotatably on a relatively fixed frame means and including drive engagement means for accommodating selective rotation thereof together with rotation limit means for selectively limiting mandrel rotation to one direction; said cylindrical tube which is so perforated, being nonetheless otherwise substantially continuous and solid along its binder-engaging periphery; and binder coupling means including minor perforate means through said mandrel means, this coupling means being adapted to be loosely engaged with the end of said binders, accommodating both straps and strand binders, and being translateable toward and away from said periphery, whereby, when said binder coupling means is translated toward said binder periphery, said strap is wound about said binder coupling means and said binder periphery, thereby coupling said strap to said binder.

2. The apparatus as recited in claim 1 wherein said coupling means comprises "slide-bar" means including at least one projecting leg adapted to be slidingly lodged in said perforate means of said mandrel tube so as to be translateable transverse to the tube's axis of rotation, this slide bar means being thus adapted to engage web binders clampingly and engage strand binders ty-ingly on means projecting therefrom.

3. The apparatus as recited in claim 2 wherein said coupling means comprises a "U-bolt" adapted to engage web binders of varying widths and thicknesses and to also engage strand binders, so that said binders are engaged in a self-tightening mode as the tube is rotated, yet are easily tied to and untied from the mandrel tube.

4. The combination as recited in claim 3 wherein said mandrel means comprises a hollow tubular metal barrel including aperture means therein adapted to receive leg portions of said U-bolt and being operatively engaged with ratchet/pawl rotation-limit means.

5. The apparatus as recited in claim 4 wherein bracket support means are included for supporting said mandrel means, said bracket means being adapted to be fixedly mounted on a load supporting surface; wherein said mandrel means comprises at least one hollow metal cylinder mounted rotatably within said bracket support means; and wherein is included cylindrical cap means affixed to the end of said cylinder for retention thereof in said support means.

6. The apparatus as recited in claim 5 wherein said U-bolt comprises a U-shaped metal rod of relatively uniform diameter and bent symmetrically so as to include a pair of parallel legs projecting symmetrically and orthogonally from the medial section thereof, these legs being sufficiently long to accommodate webs of varying thicknesses when the legs are lodged slidingly in said mandrel bores, yet not so long as to interfere with the frame support when said tube is rotated; the medial section of said U-bolt being adapted to clampingly engage the end of a web-binder against said mandrel tube, and when said U-bolt legs are thrust therethrough and beyond the tube being adapted to be tied to a strand-type binder.

7. The apparatus as recited in claim 6 wherein said support bracket means comprises a U-shaped metal bar adapted to be removably attached to a vehicle frame and including a pair of opposed bracket-legs projecting orthogonally from a central bracket section and including bores adapted to receive said mandrel tube journallingly; wherein said mandrel cylinder comprises a hollow metal tube which is substantially continuous, integral and unpierced along its medial, binder-engaging portion except for said apertures adapted to receive said U-bolt legs; and wherein said cap means comprises an over-sized metal cylinder affixed on one end of said mandrel tube so as to retain the tube on the bracket,; said cap means also including coupling means for selective application of rotational cranking action to the tube whereby to controllably wind-up a binder fastened thereon.

8. The combination as recited in claim 7 wherein said mandrel comprises a suitable length of pipe pierced to receive said U-bolt legs; and wherein said cap comprises a length of similar pipe but of slightly larger diameter affixed on one end of said mandrel pipe and including cranking bore means.

9. The combination as recited in claim 1 wherein said mandrel means comprises a hollow metal tube with a medial binder-engaging surface which is substantially continuous and unbroken except for binder-slot means formed therein, said slot means being dimensioned, disposed and adapted to receive the end of a web-binder for retention and wrapping thereof on said tube when the tube is rotated.

10. The apparatus as recited in claim 9 wherein said U-bolt comprises a U-shaped metal rod of relatively uniform diameter and bent symmetrically so as to include a pair of parallel legs projecting symmetrically and orthogonally from the medial section thereof, these legs being sufficiently long to accommodate webs of varying thickness when the legs are lodged slidingly in said mandrel bores, yet not so long as to interfere with the frame support when said tube is rotated; the medial section of said U-bolt being adapted to clampingly engage the end of a web-binder against said mandrel tube, and when said U-bolt legs are thrust therethrough and beyond the tube being adapted to be tied to a strand-type binder;

wherein said support bracket means comprises a U-shaped metal bar adapted to be removably attached to a vehicle frame and including a pair of opposed bracket-legs projecting orthogonally from a central bracket section and including bores adapted to receive said mandrel tube journallingly; wherein said mandrel cylinder comprises a suitable length of pipe pierced to receive said U-bolt legs; and which is substantially continuous, integral and unpierced along its medial, binder-engaging portion except for said slot means, this comprising a 4 to 6 inch slot; and wherein said cap means comprises an over-sized length of similar pipe but of slightly larger diameter affixed on one end of said mandrel pipe and including cranking bore means, said cap means also including coupling means for selective application of rotational cranking action to the tube whereby to controllably wind-up a binder fastened thereon.

* * * * *